US012624417B2

(12) United States Patent
Antrekowitsch et al.

(10) Patent No.: US 12,624,417 B2
(45) Date of Patent: May 12, 2026

(54) METHOD OF REMOVING VOLATILE CONSTITUENTS FROM AN INDUSTRIAL DUST, AND VALUABLE MATERIAL-CONTAINING PRODUCT

(71) Applicant: MONTANUNIVERSITÄT LEOBEN, Leoben (AT)

(72) Inventors: Jürgen Antrekowitsch, Leoben (AT); Stefan Steinlechner, Trofaiach (AT); Michael Auer, Trofaiach (AT)

(73) Assignee: MONTANUNIVERSITÄT LEOBEN, Leoben (AT)

( * ) Notice: Subject to any disclaimer, the term of this patent is extended or adjusted under 35 U.S.C. 154(b) by 462 days.

(21) Appl. No.: 18/044,727

(22) PCT Filed: Sep. 9, 2021

(86) PCT No.: PCT/EP2021/074842
§ 371 (c)(1),
(2) Date: Mar. 9, 2023

(87) PCT Pub. No.: WO2022/053568
PCT Pub. Date: Mar. 17, 2022

(65) Prior Publication Data
US 2023/0332266 A1 Oct. 19, 2023

(30) Foreign Application Priority Data
Sep. 11, 2020 (EP) .................................... 20195687

(51) Int. Cl.
| | |
|---|---|
| *C22B 7/00* | (2006.01) |
| *B09B 3/40* | (2022.01) |
| *C22B 1/24* | (2006.01) |
| *C22B 7/02* | (2006.01) |
| *C22B 19/38* | (2006.01) |

(52) U.S. Cl.
CPC ................ *C22B 7/001* (2013.01); *B09B 3/40* (2022.01); *C22B 1/2406* (2013.01); *C22B 7/02* (2013.01); *C22B 19/38* (2013.01)

(58) Field of Classification Search
CPC ......... C22B 7/001; C22B 1/2406; C22B 7/02; C22B 19/38; C22B 19/30; C21B 2100/44; C21B 2200/00; B09B 3/40; B09B 3/20; B07B 4/00; Y02P 10/20
USPC .......................................................... 75/751
See application file for complete search history.

(56) References Cited

U.S. PATENT DOCUMENTS

| | | | | |
|---|---|---|---|---|
| 5,865,875 | A | * | 2/1999 | Rinker .................... C22B 1/245 |
| | | | | 75/436 |
| 2023/0137480 | A1 | * | 5/2023 | Bonelli Arenas ....... C22B 19/26 |
| | | | | 75/710 |

FOREIGN PATENT DOCUMENTS

| | | | | | |
|---|---|---|---|---|---|
| CA | 2269937 | A1 | * | 5/1998 | ............. C22B 19/30 |
| DE | 10 2015 206 170 | A1 | | 10/2016 | |
| DE | 10 2016 122 087 | B3 | | 3/2018 | |
| EP | 2 216 419 | A2 | | 8/2010 | |
| EP | 2 937 427 | A1 | | 10/2015 | |
| JP | H09125169 | A | | 5/1997 | |
| JP | 2004131755 | A | | 4/2004 | |
| RU | 2166553 | C1 | | 5/2001 | |
| RU | 2450065 | C2 | | 5/2012 | |
| RU | 2626371 | C1 | | 7/2017 | |
| TW | 200 904 995 | A | | 2/2009 | |
| WO | WO-2018207131 | A1 | * | 11/2018 | ............... C22B 1/24 |

OTHER PUBLICATIONS

International Search Report of PCT/EP2021/074842, Dec. 22, 2021, 6 pages.
Written Opinion of International Searching Authority for PCT/EP2021/074842, Dec. 22, 2021, 7 pages.
Extended European Search Report of EP 20195687.7, Mar. 12, 2021, 7 pages.
Russian Office action for Patent Application No. 2023103846, dated Dec. 28, 2024, 9 pages.
Japanese Office action for Application No. 2023-515565, dated Aug. 5, 2025, 8 pages.

* cited by examiner

*Primary Examiner* — Sally A Merkling
*Assistant Examiner* — Nazmun Nahar Shams
(74) *Attorney, Agent, or Firm* — Womble Bond Dickinson (US) LLP

(57) ABSTRACT
A product and method for producing a valuable material product from industrial dust having the steps of providing the industrial dust, which has at least one valuable material and a first concentration of volatile constituents, to a heating device with an operating temperature of 600° C. or more, preparing the industrial dust by means of the heating device, wherein the preparation comprises heating the industrial dust at a rate of 20° C./min or more, thermally treating the industrial dust by means of the heating device at a treatment temperature in the range from 900° C. to 1200° C., in particular in the range from 1000° C. to 1100° C., for 30 minutes or more, and controlling and/or regulating the oxidizing conditions during the preparation, wherein the preparation comprises at least partially removing the volatile constituents from the industrial dust, and providing the valuable material product.

18 Claims, No Drawings

METHOD OF REMOVING VOLATILE CONSTITUENTS FROM AN INDUSTRIAL DUST, AND VALUABLE MATERIAL-CONTAINING PRODUCT

This application is a national US phase of PCT/EP2021/074842 which claims the benefit of the filing date of European Patent Application No. 20 195 687.7 filed 11 Sep. 2020, the disclosure of which is hereby incorporated herein by reference.

TECHNICAL FIELD

Embodiments of the invention relate to a method of manufacturing a valuable material product from an industrial dust. Furthermore, embodiments of the invention relate to the valuable material product which is obtained by processing the industrial dust.

Thus, embodiments of the invention may relate to the technical field of processing industrial dusts. In particular, embodiments of the invention may relate to the technical field of removing volatile constituents from industrial dusts, to thereby obtain a valuable material product.

TECHNOLOGICAL BACKGROUND

Industrial dusts, for example from the metal production or metal processing (for example in a steel mill) frequently contain undesired and recoverable valuable materials, but also undesired residues which encompass undesired metals (in compounds and/or elementary) and volatile constituents (for example halogen compounds). Nevertheless, economically processing industrial dusts for obtaining processed valuable material products, which in turn may serve as a raw material source, still constitutes a technical challenge. In the following, this is illustrated by means of an example of prior art, wherein the valuable material zinc oxide shall be recovered from a halogen-contaminated steel mill dust.

The main product by the processing of steel mill dusts with a suitable process is the so-called secondary zinc oxide which may serve almost up to 100% as a replacement or supplement for zinc concentrates which are recovered from ores.

Due to lead portions and halogen contamination, respectively the concentration of other volatile constituents, in this recycling product with a high zinc oxide portion, in conventional methods (the so-called rolling method is mainly applied), the substitution rate in the primary zinc industry is limited to 10-15%. Although the rolling oxide (this is the zinc oxide which is contaminated with disturbing substances) is generally washed, a charging in the roasting stage of the zinc industry is unavoidable, to remove residual amounts of halogens (fluor, chlorine, bromine or iodine), respectively halogen compounds and other volatile compounds. The reason for this is that, in the zinc-recovering electrolysis, chlorine leads to an increased corrosion of the electrodes and the formation of potentially hazardous chlorine gas. The disadvantage of fluor in electrolytes is the attack and the resolving of the aluminum-oxide layer at the surface of the cathodes. This leads to an increased gluing tendency of the refined zinc at the cathodes and associated downtimes and accompanying zinc losses and increased cathode wear.

Nevertheless, the substitution of primary ore concentrates by secondary zinc oxide is desired. The large iron loads, which are introduced via the ore concentrate in the primary zinc manufacture, serve for a high portion of precipitation residues, for which until today no economic processing method exists and which therefore have to be stored with high costs and environmental requirements. Per ton of produced zinc, one ton iron residue—mainly jarosite—is generated. An increase of the secondary zinc oxide portion with typically low iron amounts in the zinc recovery is therefore advantageously. A zero-waste-process is targeted, in which ideally, instead of a disposal, for example iron alloys are supplied to a use in a steel mill, and halogen containing substances are supplied to a use in the chemical industry, and slacks are supplied to a use in the construction material industry. With respect to a portion of more than 65% residual substances which are to be stored in case of a rolling process, this constitutes a vast improvement.

In case of the electric arc furnace dust (EAFD), the impurities origin from melted steel scrap and partially from slag formers. Surface coatings, lacquers, and plastic fractions are typical sources for the introduction of halogens in the steel mill dust. Under the process temperatures which are prevailing there, chlorine and fluor volatilize as compounds with lead, potassium, or sodium, and collect with other volatile elements, such as cadmium oxide and mainly zinc oxide in the dust. The main product in recycling of EAFD is ZnO which is contained in the dust. Usually, this is converted to Zn by a reduction with carbon and is evaporated at process temperatures of $1000°$ C.-$1100°$ C. (the boiling point of Zn is $907°$ C.). Due to the high oxygen affinity of gaseous zinc, an immediate exothermic re-oxidation of the Zn to ZnO occurs in the exhaust gas system, which at the same time constitutes the product of the recycling method. Since a main portion of the present halogen compounds in the steel mill dusts comprise a high vapor pressure, partially even boiling points which are below the process temperatures, these also evaporate, collect in the product (ZnO) and impurify it. In the primary zinc industry, this product is used almost up to 100% as a substitution for zinc concentrates which are recovered from ores. Due to the halogen load and the lead concentration, the substitution rate is nevertheless limited to 10-15% in the primary zinc manufacture. On the one hand, the use in the roaster is desired due to the cooling effect of the oxides, on the other hand, the contained halogen compounds may lead to undesired caking.

Nevertheless, the substitution of primary ore concentrates by secondary ZnO is desired. In order to relieve the roasting stage, the contaminated secondary ZnO from typical recycling methods, such as the rolling tube, is subjected to an elaborate subsequent soda-washing. Although very low chlorine amounts and alkaline amounts can be achieved, a removal of lead and fluor is nevertheless not possible in this way. In addition, variants of a thermal treatment of the contaminated ZnO exist. However, these are characterized in a disadvantageous manner by a large energy consumption and large zinc losses, and a milling after the treatment is required, to be able to provide an efficiently leachable zinc oxide for the primary zinc production.

SUMMARY OF THE INVENTION

There may be a need to provide a method which enables the removal of volatile constituents from a valuable material-containing industrial dust in an efficient and robust manner.

This need is met by the subject-matters according to the independent patent claims. Preferred embodiments result from the dependent patent claims.

According to an aspect of the invention, a method of manufacturing a valuable material product from an industrial dust (in a heating device) (and a corresponding method of operating the heating device, respectively) is described. The method comprises:

i) providing the industrial dust (as dust particles or also as agglomerated dust particles) which comprises at least one valuable material (e.g. a metal oxide, in particular zinc oxide) and a first concentration of volatile constituents (e.g. halogens and metals which do not constitute a valuable material), to a heating device with an operation temperature (thus a preheated heating device) of 600° C. or more (in particular 700° C. or more, further in particular 800° C. or more), ii) processing the industrial dust by the (preheated) heating device, wherein processing comprises:

iia) (extremely rapidly) heating the industrial dust (e.g. by the heating device) with a rate (or an increasing rate which is as high as possible) of 20° C./min or more (in particular 30° C. or more, further in particular 50° C. or more, further in particular 100° C. or more, further in particular 150° C. or more), iib) (specifically) thermally treating the industrial dust by the heating device with a treatment temperature in the range from 900° C. to 1200° C., in particular in the range from 1000° C. to 1100° C., for 30 minutes or more (in particular 60 minutes or more, further in particular 120 minutes or more), and (at the same time)

iib) (specifically) controlling and/or regulating the oxidizing conditions during processing (e.g. by controlling/regulating the supply of air/oxygen).

These processing stages are performed, such that the volatile constituents of the industrial dust are (at least partially) removed. The method further comprises:

iii) providing the valuable material product.

Preferably, the valuable material product which is obtained by the described processing comprises the at least one valuable material and a second concentration of volatile constituents which is (significantly) lower than the first concentration of volatile constituents (the volatile constituents have been significantly depleted or (substantially) removed, while the valuable material remains, in particular may even be concentrated).

In this context, the term "providing" may denote any addition of industrial dust to/in a heating device. In this context, the term "dust" may denote any material which is present in the form of solid particles. The particles may comprise different sizes and may be of different origin. In an example, the particles may remain suspended in gasses for a certain time, in particular in air. In another example, a dust may comprise particles with sizes in the millimeter-range or smaller, in particular sizes in the micrometer-range.

The industrial dust is the starting material, the educt, of the method; the product of the method is the valuable material product. In the context of this document, the term "industrial dust" may in particular denote an educt which occurs in the producing industry substantially as waste-residue in form of dust. For example, in the metal generating industry or in the metal processing industry, metal containing dusts are produced or occur as production waste. In an exemplary embodiment, the industrial dust may occur in a process in a steel mill (for example electric arc furnace for melting scrap) as so-called steel mill dust.

In case of an iterative execution of the method, the used industrial dust itself may also be a valuable material product from a previous execution of the method or may be based on such a valuable material product.

The industrial dust may contain multiple types of dust from one or from more sources or may consist of it. For example, the industrial dust may be in powder form as dust particles or may be in pieces as agglomerated dust particles, for example as pellets.

The industrial dust contains at least one valuable material (for example a, preferably desired or economically relevant, metal oxide, in particular zinc oxide) and a first concentration of contaminants. Valuable material may here denote a content of the industrial dust, whose utilization as raw material is sought. Besides valuable materials, the industrial dust also contains other contents—here denoted as contaminants. These contaminants may impede the utilization of the valuable material. To enable an economic and technologically reasonable utilization, the concentration of the valuable material or the at least partial removal of contaminants in the industrial dust is sought. A valuable material product contains at least one valuable material, it may also contain multiple different valuable materials.

By the method according to embodiments of the invention, contaminants of the industrial dust are at least partially removed. The method enables providing a valuable material product which comprises the at least one valuable material. The valuable material product comprises a second concentration of contaminants (optionally volatile constituents) which is lower in comparison to a first concentration of contaminants (optionally volatile constituents) in the industrial dust. The second concentration may also be 0 or substantially 0. The contaminants are significantly depleted or optionally removed, while the valuable material remains, in particular is even concentrated.

According to embodiments of the invention, the industrial dust is at first provided to a heating device with an operation temperature of larger than 600° C. For example, the industrial dust may be provided as dust or after an agglomeration as agglomerate. Providing encompasses that the industrial dust is made accessible for the heating effect of the heating device—for example it is inserted in a heating device. Thus, when the industrial dust is provided, the heating device is already pre-heated to 600° C. or more. Preferably, the operation temperature is 700° C. or more, especially preferred 800° C. or more.

In the context of this document, the term "heating device" may in particular denote any device which is suitable to heat a material, in particular an industrial dust. For this purpose, the heating device may comprise a hollow space in which the material may be introduced, and in which thermally treating may then be performed. The temperature within the heating device is in particular controllable and/or regulatable. Additionally, when heat is generated by oxidation processes (for example by burners), for example, the supply of oxidation agents, such as air and/or oxygen, may be controllable. The heating device may be already heated when material to be heated is inserted. Additionally, by the described heating device, in particular an especially rapid heating—for example at least 150° C./min—may be realized. In an embodiment, the heating device may be a metallurgic treatment aggregate. In an exemplary embodiment, the heating device is a fireproof rotatable container. For example, further embodiments encompass a top blown rotary converter (TBRC) or short drum furnace (German: Kurztrommelofen; KTO), which combine the burner side and the exhaust gas side, or a roller tube (German: Wälzrohr) which opposingly separates the firing and the venting of the exhaust gas.

After providing, processing by the heating device is performed, for example in the heating device. Processing comprises heating the industrial dust which may be executed by the heating device, for example in the heating device. It is executed with a rate of at least 20° C./min, preferably 30° C./min, especially preferred at least 50° C./min, especially preferred at least 100° C./min, even more preferred at least 150° C./min. This heating is extremely rapid, the increase rate during heating is selected as high as possible. According to embodiments of the invention, processing encompasses thermally treating by the heating device (for example in the heating device) with a treating temperature in a temperature range of 900° C. to 1200° C. (preferably 1000° C. to 1100° C.) for at least 30 minutes (preferably at least 60 minutes, especially preferred at least 120 minutes, even more preferred 150 minutes).

During processing, oxidizing conditions are adjusted. Therefore, the industrial dust is subjected to oxidizing conditions. Preferably, the adjustment of the oxidizing conditions is performed specifically. The oxidizing conditions may be controlled and/or regulated. Thus, it is adjusted, that no reducing conditions are present, and it is optionally regulated and/or controlled how the oxidizing conditions, optionally in the heating device, are pronounced. For example, this may be performed by controlling and/or regulating the supply of the oxidizing agent (such as air and/or oxygen), and/or by controlling and/or regulating the supply of air and/or oxygen to burners which are serving as heating sources (additionally or alternatively, also an electric heating device may be selected).

In the context of this document, the term "valuable material product" denotes a product which is obtained from the above described industrial dust by applying the method stages according to embodiments of the invention. The valuable material product may be present as dust, however, the valuable material product may preferably also be present as agglomerate of dust particles. The valuable material product is characterized by the presence of at least one valuable material which may be a metal oxide, for example, such as zinc oxide or copper oxide. The valuable material product is characterized by the concentration of contaminants being significantly reduced in comparison to the industrial dust. In particular, the portion of halogens and/or undesired metals may be significantly reduced. In a preferred embodiment, the concentration of the valuable material in the valuable material product may be increased in comparison to the supplied industrial dust.

The contaminants may be volatile constituents of the industrial dust. In the context of this document, the term "volatile constituents" may in particular denote constituents of an industrial dust which, in the presence of a certain temperature (optionally after one or more chemical reactions), transition to the gaseous phase by evaporating. In an embodiment, the certain temperature may be defined such that it is below the melting temperature of the industrial dust. In a further embodiment, the certain temperature may be below 1500° C., for example. Volatile constituents may be halogen compounds of chlorine or fluor, for example; for example, lead fluoride is volatile at 1293° C., or lead chloride is volatile at 950° C.

According to an exemplary embodiment, the invention may be based on the idea that (at least partially) removing volatile constituents from a valuable material-containing industrial dust is enabled in an efficient and robust manner, when a specific processing procedure is performed in a heating device, which comprises at least the following stages:

introducing the industrial dust at 600° C. or above, heating with a rate of (at least) 20° C./min or more, and thermally treating in the range of 900° C. to 1200° C. for
      (at least) 30 min, wherein the oxidizing conditions are controlled and/or regulated.

In prior art, numerous attempts have already been made to selectively volatilize contaminants, such as undesired volatile constituents from industrial dusts—wherein the volatile constituents significantly reduce the value of the industrial dusts, and/or make them unusable. However, all these attempts have not been successful. At present, no thermal method is known which enables an efficient and robust and at the same time economic removal of the volatile constituents from industrial dusts.

However, now it was surprisingly found out during extensive and intense studies, that by the method according to embodiments of the invention, the technical prejudice may be overcome, that volatile constituents cannot be removed from industrial dusts in an efficient and robust manner.

For a successful course and the associated maximum achievable extraction rates of contaminants, in particular volatile constituents from the industrial dust, the temperature control in the first minutes, but also the further thermal treatment, is of decisive importance. Thereby, it may be ensured, that no time is given to the contaminants, in particular volatile constituents, to react with other compounds which are contained in the industrial dust to non-volatile compounds. Thereby, the formation of new compounds which are not volatile under the specified process temperatures is efficiently inhibited and/or disabled.

Without the intention to be bound to any specific theory, it is currently assumed, that—via chemical reactions between the volatile constituents—always a formation of non-volatile constituents takes place in the case of conventional temperature courses. For example, calcium fluoride may be formed, which comprises a high boiling point of 2533° C. However, in the contrast to this, the conditions according to embodiments of the invention disable the chemical reactions to non-volatile constituents, and instead promote chemical reactions to volatile constituents; for example a reaction of calcium fluoride with lead oxide to lead fluoride, which comprises only a boiling point of 1293° C. In this way, only the exact application of the conditions according to embodiments of the invention seems to serve for the volatile constituents reacting to further volatile constituents, and only to a low extent or not to non-volatile constituents.

In addition, the described method enables an environmentally friendly recycling of industrial dusts to valuable materials, while these industrial dusts conventionally are elaborately and less economically friendly processed or must be even disposed in a cost-intense manner.

The recovered valuable material, for example zinc oxide, may serve as substitute of primary are concentrates and may offer flexible utilization possibilities. In the case of highly pure zinc oxide, a direct utilization in economically relevant markets for high quality zinc oxide—for example in the tire industry, for the ceramic manufacture, in the chemical industry—may be enabled.

In summary, the described method may be denoted as more efficient, more energy-optimized, and as more resource-saving than conventional methods, and thus constitutes an environmentally friendly alternative.

According to an embodiment, the contaminants comprise volatile constituents. According to an embodiment, the volatile constituents encompass halogen, in particular fluor and/or chlorine, mainly in compounds, not elementary. Additionally or alternatively, the volatile constituents encompass a metal which is undesired or economically not relevant, in particular a metal in compounds and not elementary, further in particular a metal of the group which consists of lead, cadmium, sodium, potassium, calcium. This may have the advantage, that undesired constituents which significantly reduce the value of the industrial dust can be specifically removed.

According to a further embodiment, the valuable material encompasses a metal oxide (in particular zinc oxide and/or copper oxide). This may have the advantage that an industrial dust waste material may become a raw material storage for industry-relevant materials. Industrial dusts, in particular such from the metal recovery or metal processing, process-inherently comprise a number of metals or metal compounds, such as metal oxides, which may constitute interesting valuable materials, for example for the production of secondary/highly pure metals or metal compounds, such as metal oxides.

According to a further embodiment, the industrial dust is, at least substantially, in the form of dust particles, in particular in form of dust particles which origin from the metal recovery or metal processing.

According to a further embodiment, the dust particles encompass steel mill dust or dust from the copper industry. In particular at least one dust of the group which consists of: electric arc furnace dust (EAFD), dust from a foundry operation, dust from integrated steel manufacturing routes (German: Stahlherstellungsrouten), dust from a sinter operation. This may provide the advantage, that dust particles from different industry-relevant production processes may be efficiently processed.

According to a further embodiment, providing the industrial dust encompasses: agglomerating the dust particles of the industrial dust. Thereby, the method according to embodiments of the invention may be executed even more efficient, since a dusting (German: Verstaubung) can be impeded to a large extent. In an example, agglomerating the dust particles may be performed as pelletizing (for example by pelletizing plates (German: Pelletier-Teller)). In another embodiment, agglomerating may be enabled by employing a compulsory mixer (German: Zwangsmischer). As additive for the required green strength of the agglomerates, water may be sufficient. For example, the already present halogens in connection with the water may serve for the required bonding forces.

According to a further embodiment, the method according to embodiments of the invention is performed discontinuously or in a batchwise manner (in particular by batches of agglomerated industrial dust). This may have the advantage, that the required thermally treating is performed in a specific and robust manner.

While it is conventionally assumed, that methods of manufacturing valuable material products always have to be performed continuously, to achieve a desired profitability, in the present case, it has surprisingly turned out, that the exact opposite, namely the discontinuous process, may lead to the desired results. In a preferred embodiment, the industrial dust is agglomerated, so that the agglomerates can be supplied to the processing as batches. The method of manufacturing valuable material products according to embodiments of the invention may then be operated in a batchwise manner, to ensure that the desired and required conditions for each batch are fulfilled.

According to a further embodiment, providing the industrial dust encompasses: drying the, in particular agglomerated, industrial dust. Thereby, the method may be performed more efficiently, since a bursting due to a too rapid discharge of water vapor may be avoided. For example, the drying temperature may be in a range of 105 to 350° C., in particular at 200 to 300° C. The duration of the required drying is 24 to 72 hours in an example, in particular 40 to 60 hours.

According to a further embodiment, thermally treating encompasses: controlling and/or regulating the water vapor in the heated atmosphere, such that a water vapor partial pressure of at least 0.1 bar is present. The partial pressure may denote the partial pressure of a single component or fraction in a (ideal) gas mixture. Controlling and/or regulating is performed via the humidity of the industrial dust, for example, or in case of the use of burners via the type of the substances which are supplied to the burners, such as combustibles, oxidizing agents, and/or their quantity ratio. Controlling and/or regulating the water vapor in the heated atmosphere may also be performed via controlling and/or regulating pressure conditions, and/or temperature conditions, and/or volume conditions in the heating container.

According to a further embodiment, thermally treating encompasses: mixing the industrial dust. In particular, this may be achieved by (at least temporarily) rotating at least a part of the heating device which is filled with the industrial dust. This may have the advantage, that a continuous mixing and an increase of the active surface of the material is enabled, and a homogenous treatment is therefore ensured. In an embodiment, the revolution speed may be in a range from 1-10 U/min, in particular 2-3 U/min.

According to a further embodiment, adjusting oxidizing conditions comprises controlling and/or regulating the oxidizing conditions: supplying an oxidizing agent (in particular oxygen and/or air) to a combustible, such that the combustion air ratio is hyperstoichiometric, in particular in the range of 1.1 to 1.5 (further in particular in the range of 1.3 to 1.4), wherein the boundary values of the ranges are encompassed. This may have the advantage, that efficient oxidizing conditions are present which are controllable and/or regulatable in a specific manner.

According to a further embodiment, the industrial dust comprises a first concentration of a valuable material, and processing encompasses: concentrating the valuable material, such that the valuable material product comprises a second concentration of the valuable material which is larger than the first concentration. This has the advantage, that the valuable material in the valuable material product is concentrated. Thereby, it may become an even more valuable raw material.

According to a further embodiment, the method according to embodiments of the invention encompasses (in particular during heating and/or during thermally treating): (at least partially) inhibiting a chemical reaction of a halogen and/or a metal to a non-volatile constituent (for example calcium fluoride). Additionally or alternatively: promoting a chemical reaction of a halogen and/or a metal to a volatile constituent (for example lead fluoride). This may provide the advantage, that substantially only volatile constituents are present as contaminants, and/or no new non-volatile substances are generated, whereby evaporating these contaminants and/or newly generated substances is enabled without non-volatile residues.

According to a further embodiment, the method comprises at least one of the following features:

i) removing at least 90%, in particular at least 95%, of the content of at least one member of the group which consists of chlorine, lead, cadmium, from the industrial dust, ii) removing at least 80%, in particular at least 85%, of the content of at least one member of the group which consists of fluor and potassium, from the industrial dust, iii) removing 45% (in particular 50%) or more sodium from the industrial dust.

In an embodiment, these features reflect the efficiency of removing contaminants, in particular volatile contaminants, and show how the value of an industrial dust can be significantly increased without high expense.

According to a further embodiment, heating the industrial dust is performed with a rate of at least 30° C./min, preferably at least 50° C./min, especially preferred at least 100° C., even more preferred at least 150° C. In exemplary embodiments, these parameters have turned out as especially efficient.

According to a further embodiment, thermally treating the industrial dust in the heating device is performed for at least 30 minutes, preferably at least 60 minutes, especially preferred at least 120 minutes, even more preferred for at least 180 minutes. In exemplary embodiments, these parameters have turned out as especially efficient.

According to a further aspect of the invention, a method of providing a metal oxide, in particular zinc oxide and/or copper oxide, is described, the method comprising: i) manufacturing a valuable material product according to a method according to embodiments of the invention and/or using a correspondingly manufactured valuable material product, and ii) further processing the valuable material product, to provide a highly pure metal oxide and/or a secondary metal oxide.

According to a further embodiment, further processing the valuable material product is performed in an electrolysis-free manner. This may have the advantage, that energy and costs may be saved.

According to a further aspect of the invention, a processed valuable material product is described, which is manufactured from industrial dust and which comprises: i) zinc oxide (in particular at least 10 weight percent, further in particular at least 20 weight percent, further in particular at least 25 weight percent, further in particular at least 30 weight percent, zinc oxide), and at least one of the following features: a) a fluor concentration of 0.2 weight percent or less, b) a halogen concentration of 2 weight percent or less, c) a lead concentration of 1 weight percent or less, d) a cadmium concentration of 0.05 weight percent or less, e) a concentration of volatile constituents of 5 weight percent or less.

According to a further embodiment, the processed valuable material product comprises dust particles which are (substantially) agglomerated. This feature may reflect the manufacturing process in which the dust particles are agglomerated (for example to pellets). This has the advantage that a (excessive) dusting is advantageously prohibited. Furthermore, dust portage, for example by air streams, can be prevented.

According to a further embodiment, the valuable material product comprises dust particles which are (substantially) agglomerated.

DETAILED DESCRIPTION OF EXEMPLAR EMBODIMENTS

In the following, some exemplary embodiments of the present invention are described in detail.

According to an exemplary embodiment, a method for selectively removing halogens and other volatile constituents from steel mill dusts by a specific thermal treatment under controlled oxidizing conditions, a steel mill dust which is to a large extent freed from hazardous accompanying elements and compounds, obtainable by such a method, and its use for manufacturing highly pure secondary zinc oxide are described.

According to an exemplary embodiment, there may be a need to process steel mill dusts which are contaminated with volatile constituents (such as halogen compounds or lead compounds or lead), such that a main part of the halogen compounds and other volatile constituents are removed, to enable to obtain a zinc oxide from the dusts, which offers more possibilities to the primary zinc industry with respect to the substitution of primary ore concentrates, or, in the case of highly pure produced zinc oxide, enables a direct use in the economically attractive market for high quality zinc oxide (tire industry, ceramic, chemical industry, etc.). As a further consequence, this would also lead to a high saving potential with respect to energy due to the omission of the zinc obtaining electrolysis (part of the primary process).

According to an exemplary embodiment, there may be a need to provide a method by which a zinc oxide containing steel mill dust, as it occurs for example when melting steel scrap in the electric arc furnace, is freed from halogen compounds and other volatile constituents. Thereby, it is ensured, that such treated steel mill dusts are a starting point for the production of highly pure secondary zinc oxide. Either the portion of occurring iron residue in the primary zinc manufacture may be drastically reduced, even when increasing the used amount of secondary zinc oxides in comparison to ore concentrates, or alternatively, the value creation when processing steel mill dust is significantly increased. This takes place by being able to sell the recycling product zinc oxide with significantly higher prices in the market for high quality zinc oxide. If the product quality is increased by the new method, the new method is more efficient, more energy-optimized and also more resource-saving than previous methods, and thus constitutes an economically friendly alternative.

According to an exemplary embodiment, the method encompasses the following stages: i) agglomerating the industrial dust, ii) drying, iii) specifically thermally treating under controlled oxidizing conditions. At the end of the treatment, a chlorine removal, lead removal, and cadmium removal of >90%, a fluor removal of >80%, and a substantial reduction (e.g. at least 50%) of the potassium content and sodium content from the steel mill dust (or the provided industrial dust) results. A central aspect is that, due to the oxidizing conditions, the zinc oxide, which is contained in the steel mill dust, almost completely remains in the solid material in which concomitantly, by the removal of the contaminants, the concentration of valuable metal increases. Thereby, the steel mill dust, which is for the most part purified from halogen compounds and other volatile compounds, can be used as starting product for the manufacture of qualitatively higher secondary zinc oxide in the usual recycling processes, or for the manufacture of highest quality zinc oxide in a following reducing method stage which is coordinated with this objectively described thermal treatment stage.

According to an exemplary embodiment, the following advantages can be achieved: i) the product quality of the valuable material (in particular zinc oxide) is increased, ii) the application fields of the produced valuable material encompass both the primary metallurgy and high quality metals, iii) the portion of precipitation residues in the primary method manufacture can be reduced, iv) by specific exhaust gas routing and cooling, the process plant may be protected against increased corrosion (by the increased halogen load), v) the deposited concentrated halogen residue may in turn be used as raw material for corresponding (industrial) uses (further processing in the chemical industry, e.g. recovery of lead compounds by lead chloride), vi) the energy consumption may be kept low by a hot-batching (German: Heißchargierung) in a directly subsequent reduction stage for a metal oxide recovery, vii) the described process may also be performed in small plants (e.g. production of 10,000 tons/year), while the use of the rolling tube of prior art is exclusively enabled at a minimum tonnage of approximately 100,000 tons/year.

In the following, two exemplary embodiments of the invention are described in detail.

Embodiment 1

In a (first) method stage, an agglomeration is performed, to prevent an excessive dusting as a consequence. Both, pelletizing by pelletizing plates and agglomeration by employing a compulsory mixer are possible. As an additive for the required green strength of the agglomerates, water is sufficient. The halogen compounds which are contained in the steel mill dust, in connection with water, serve for the required bonding forces. The provided steel mill dust contains halogen compounds with chlorine and fluor and other volatile constituents with lead and cadmium. The dust is in particular electric arc furnace dust (EAFD), but also similar residues, such as dusts from a foundry companies, dust from integrated steel manufacturing routes, inclusively secondary metallurgy, dusts from a sinter operation, and dusts of the copper industry.

Typical compositions of highly zinc-containing steel mill dusts from the electric arc furnace route are summarized in the following table 1.

TABLE 1

| typical compositions of highly zinc-containing steel mill dusts | |
| --- | --- |
| weight % | Steel mill dust |
| Zn | 15.0-40.0 |
| Pb | 2.0-6.0 |
| Cl | 0.1-5.0 |
| F | 0.1-1.5 |
| Cd | 0.01-0.3 |
| Fe | 15.0-35.0 |
| CaO | 3.5-15.0 |
| MgO | 1.5-9.0 |
| $SiO_2$ | 1.0-8.0 |

In a following method stage, the dust agglomerates are subjected to a thorough cleaning, to avoid a later bursting due to a too rapid discharge of the water vapors. The drying temperature is in a range of 105 to 350° C. (in particular 200 to 300° C.). The duration of the required drying is 24 to 72 hours, usually 40 to 60 hours, however until the weight constant is reached.

In a further method stage, the produced dust agglomerates are batched in a heating device (for example a metallurgic treatment aggregate) and are subjected to a specific thermal treatment under controlled oxidizing conditions for selectively volatilizing the volatile constituents. As heating device, a fireproofly brick-lined rotating vessel is used. The position of the firing and the exhaust gas routing play a minor role. A configuration as top blown rotary converter (TBRC) or short drum furnace (KTO) which may combine the burner side and the exhaust gas side is possible, as well as a rolling tube which opposingly separates the firing and the discharge of the exhaust gas. The process temperatures are between 90° and 1200° C. (in particular between 100° and 1100° C.). At the required removal of the main part of the halogen compounds and other volatile constituents from the steel mill dust, the treatment duration may be between 2 and 3 hours (preferred 1.5 hours).

The rotating motion of the vessel serves for a continuous mixing and an increase of the active surface of the charged material, and therefore ensures a homogenous treatment of the agglomerates. The rotary speed may be in a range of 1-10 U/min. (In particular 2-3 U/min).

The firing is performed by a burner which uses either pure oxygen or air for burning the gases. The controlled oxidizing conditions are achieved by a controlled and/or regulated supply of oxygen/air. The combustion air ratio A, depending on the present dust composition, is between 1.1 and 1.5 (in particular between 1.3 and 1.4).

In the heating phase, preferably a heating rate of 150° C./min (at each point in time) is intended. Thereby, it is ensured that no time is given to the halogen compounds and other volatile constituents in the steel mill dust, to react with other compounds in the charging good (in particular to non-volatile constituents). The formation of possible compounds, which are not volatile under the specified process temperatures, is thereby effectively prevented. If it is not complied with the described temperature control (in particular also with the described atmosphere composition) in this phase of the treatment time, an efficient removal of the halogens and other volatile constituents is not possible.

As an example for this, a possible formation of calcium fluoride or calcium chloride may be mentioned, which occurs in the case of a heating velocity which is different from the described one (in particular too slow). While fluor in a compound with sodium, potassium, or lead tends to a volatilization under the prevailing conditions, the removal by evaporation of calcium fluoride is excluded. The fluor contents which remain in the treated steel mill dust in such a scenario lead to a reduction of the achievable quality of the generated product of such a product stage. At the prevailing temperatures of 900 to 1200° C. (in particular 1000 to 1100° C.), the volatilization of the compounds which are contained in the dust from the industrial dust starts immediately, but in particular not exclusively of the present halogen compounds.

Thus, in the first phase of the process, a reduction of the concentration of the elements cadmium, lead, and chlorine is performed, but also the sodium content, the potassium content, and the fluor content reduce without a significant conversion of the present fluor compounds to a not volatile calcium fluoride. Besides cadmium oxide, the lead evaporates, partially as lead oxide, but also as lead chloride, and potentially formed lead fluoride, by the reaction of gaseous lead oxide with other fluorides.

Concomitantly with the rapid heating velocity, an additional process takes place by which the fluor output can be increased once again. Calcium fluoride which is potentially already present may react with gaseous lead oxide to lead fluoride and calcium oxide again, whereby an efficient volatilization is possible. However, this takes place only in case of rapid heating rates and adjusted/controlled atmospheric conditions in the reaction vessel, whereby a premature evaporation of the lead oxide is prevented. In other words, it is to be impeded, that a decisive reaction educt would miss in the thermal reaction window of the subsequent equation.

$$CaF_{2(s)}+PbO_{(g)}-PbF_{2(g)}+CaO_{(s)}$$

The decreasing amounts of sodium and potassium and chlorine and fluor are mainly caused by the further evaporation of the halogen compounds with lead, sodium and potassium which are present in the steel mill dust. In the second phase of the treatment, a continuous, but decelerated volatilization of the compounds (e.g. filter house) with a lower vapor pressure is performed, such as sodium and potassium with fluor.

At the end of the treatment, a chlorine removal, lead removal, and cadmium removal of >90%, a fluor removal of >80%, and a substantial reduction (e.g. above 50%) of the potassium amount and sodium amount in the steel mill dust with respect to the original industrial dust results.

It is also essential that, due to the oxidizing conditions, the zinc oxide which is present in the steel mill dust remains almost completely in the solid material, in which concomitantly the concentration of valuable metal increases. Thereby, the steel mill dust, which is for the most part freed from halogens, can be used as starting product for the manufacture of secondary zinc oxide in the typical recycling processes or, however, also for the manufacture of high-quality zinc oxide in a newly developed method stage which is coordinated with respect to this previous stage.

Embodiment 2

A steel mill dust from the operation of an electric arc furnace for manufacturing construction steel with 100% scrap utilization and a steel mill dust from the operation of an LD-converter with approximately 20% scrap utilization serve as starting point. According to the treatment scheme and measurement scheme, which is described in the following, 2 tests were performed. One test was performed with the electric arc furnace dust alone, and the second with a mixed dust (80% electric arc furnace dust+20% LD-dust). The following tables 2 and 3 show the composition of the dusts which were used for the test.

TABLE 2 composition of the electric arc furnace dust which was used for the removal of halogens and other volatile constituents
Electric arc furnace dust

| Constituent | Amount [weight %] | Constituent | Amount [weight %] |
|---|---|---|---|
| F | 0.49 | Mg | 0.89 |
| Cl | 5.20 | Mn | 1.20 |
| Na | 2.20 | Si | 1.10 |
| K | 1.70 | Al | 0.75 |
| Fe | 15.50 | Zn | 35.20 |
| Ca | 2.10 | Pb | 2.80 |
| Cr | 0.24 | Ni | 0.02 |
| Cu | 0.32 | Cd | 0.12 |

TABLE 3 composition of the mixed dust which was used for the removal of halogens and other volatile constituents
Mixed dust (80 % electric arc furnace dust + 20% LD-dust)

| Constituent | Amount [weight %] | Constituent | Amount [weight %] |
|---|---|---|---|
| F | 0.40 | Mg | 1.98 |
| Cl | 4.25 | Mn | 0.99 |
| Na | 1.80 | Si | 1.55 |
| K | 2.45 | Al | 0.63 |
| Fe | 19.40 | Zn | 30.5 |
| Ca | 2.38 | pb | 2.90 |
| Cr | 0.23 | Ni | 0.21 |
| Cu | 0.63 | Cd | 0.10 |

The dusts were agglomerated by a pelletizer-plate. As additive for achieving the green strength for the agglomeration, an addition of water was performed. The high amounts of halogens in connection with water serve for the required bonding forces and therefore for a sufficient green strength. Hydrating the calcium oxide acts in a supporting manner. After finishing the pelletizing, the agglomerates were subjected to a thoroughly drying. The drying was performed at 200° C. for 48 hours. After drying, the use of the pellets in a rotating metallurgic vessel was performed, which was configured as TBRC and brick-lined in a fireproof manner. The energy supply for the specific thermal treatment was performed by a $CH_4/O_2$-burner, which also served for the controlled oxidizing conditions during the process by a controlled and/or regulated $O_2$-supply. The treatment was performed in batches of 40 kg.

The selected process parameters during the specific thermal treatment under controlled oxidizing conditions are listed in the following table 4.

TABLE 4 selected process parameters

| Process parameter | Value |
|---|---|
| Temperature (T) | 1100° C. |
| Combustion air ratio (λ) | 1.2 |
| Rotation speed (n) | 2 U/min |
| Heating rate (ΔT) | 150° C./min |
| Treatment duration (t) | 2.5 h |

During the treatment, besides a permanently installed temperature measurement of the furnace atmosphere, also the prevailing temperature in the filling (German: Schüttung) is tested in regular intervals. A sampling interval of 10 min served for a continuous monitoring of the process progress of the removal of the halogens and other volatile constituents (e.g. via a filter house) from the steel mill dust, in the context of the specific thermal treatment under controlled oxidizing conditions.

After the completed treatment, the treated dust agglomerates were removed from the furnace and were transferred in a steel mold (German: Stahlkokille) for cooling to room temperature. After the completed cooling, a sampling was performed for the final analysis. The results of the measurements can be taken from the following table 5.

TABLE 5 results of the removal of halogens and other volatile constituents from steel mill dust by a specific thermal treatment under controlled oxidizing conditions

| Electric arc furnace dust | | |
| --- | --- | --- |
| Test 1 | Before treatment | After treatment |
| Mass | 40.00 kg | 33.48 kg |
| Elements | Weight % | |
| Cl | 5.2 | 0.26 |
| F | 0.49 | 0.05 |
| Na | 2.2 | 0.68 |
| K | 1.7 | 0.22 |
| Pb | 2.8 | 0.11 |
| Cd | 0.12 | <0.02 |
| Zn | 35.2 | 38.24 |

| Mixed dust | | |
| --- | --- | --- |
| Test 2 | Before treatment | After treatment |
| Mass | 40.00 kg | 34.60 kg |
| Elements | Weight % | |
| Cl | 4.25 | 0.23 |
| F | 0.4 | 0.08 |
| Na | 1.8 | 1.00 |
| K | 2.45 | 0.42 |
| Pb | 2.9 | 0.30 |
| Cd | 0.1 | <0.01 |
| Zn | 30.5 | 33.1 |

It can be taken from the measuring results, that the zinc amounts significantly increase in both cases. This is caused by the removal of the halogens and other volatile constituents.

On the contrary, the chlorine amounts and the fluor amounts can be distinctly reduced by the specific thermal treatment under controlled oxidizing conditions. In addition, a significant removal of the elements lead, cadmium, potassium, and sodium becomes apparent.

Therefore, with support of the method according to embodiments of the invention for removing halogens and other volatile constituents from steel mill dusts by a specific thermal treatment under controlled oxidizing conditions, it is possible to free steel mill dust and other metal-containing dusts to a large extent from contaminants, such as preferably Cl, F, Cd, Pb, K and Na. These elements are mainly responsible for the reduced zinc oxide quality at the recycling methods of steel mill dust which are established today. Thereby, it is possible to recover highly pure zinc oxide from steel mill dusts and therefore to drastically reduce the residual contamination of the primary zinc industry on the one hand, and to achieve an additional upvaluation by a possible application at the market for high quality zinc oxide (tire industry, ceramic, chemical industry, etc.) on the other hand.

Supplementary, it is to be noted that "comprising" does not exclude other elements or steps, and "a" or "an" does not exclude a multiplicity. Furthermore, it is noted that features or steps which are described with reference to one of the above embodiments, may also be used in combination with other features or steps of other above-described embodiments.

The invention claimed is:

1. A method of manufacturing metals or metal oxides from an industrial dust, wherein the method comprises:
   preheating a heating device to an operation temperature of 600° C. or more;

providing the industrial dust which comprises at least one metal or metal oxide and a first concentration of volatile constituents to the preheated heating device with an operation temperature of 600° C. or more;
   processing the industrial dust by the heating device, wherein processing comprises:
      heating the industrial dust with a rate of 20° C. per minute or more,
      thermally treating the industrial dust by the heating device with a treating temperature in a range of 900° C. to 1200° C. for 30 minutes or more, and
      controlling or regulating oxidizing conditions during processing,
   wherein the processing comprises: at least partially removing the volatile constituents from the industrial dust; and
   providing the metals or metal oxides.

2. The method according to claim 1, wherein the metal or metal oxide comprises the at least one valuable material and a second concentration of volatile constituents which is lower than the first concentration of volatile constituents.

3. The method according to claim 1,
   wherein the volatile constituents comprise a halogen; or
   wherein the volatile constituents comprise a metal.

4. The method according to claim 1, wherein the metals or metal oxides comprises a metal oxide.

5. The method according to claim 1,
   wherein the industrial dust is substantially in the form of dust particles.

6. The method according to claim 5,
   wherein the dust particles comprise steel mill dust or dust from the copper industry.

7. The method according to claim 1,
   wherein providing the industrial dust further comprises:
      agglomerating the dust particles of the industrial dust.

8. The method according to claim 1,
   wherein processing is performed in a batchwise manner.

9. The method according to claim 1,
   wherein providing the industrial dust further comprises:
      drying the industrial dust.

10. The method according to claim 1,
   wherein thermally treating further comprises:
      controlling or regulating water vapor in a heated atmosphere, such that a water vapor partial pressure of 0.1 bar or more is present.

11. The method according to claim 1,
   wherein thermally treating further comprises:
      mixing the industrial dust.

12. The method according to claim 1,
   wherein controlling or regulating the oxidizing conditions comprises:
      supplying an oxidizing agent, such that a combustion air ratio is hyperstoichiometric.

13. The method according to claim 1,
   wherein the industrial dust comprises a first concentration of the at least one metal or metal oxide, and wherein processing further comprises:
   concentrating the metal or metal oxide, such that the processed metal or metal oxide product comprises a second concentration of the at least one metal or metal oxide, which is larger than the first concentration.

14. The method according to claim 1, wherein processing further comprises:
   at least partially inhibiting a chemical reaction of a halogen or a metal to a non-volatile constituent; or
   promoting a chemical reaction of a halogen or a metal to a volatile constituent.

15. The method according to claim 1, wherein heating the industrial dust is performed with a rate of 30° C. per minute or more; and wherein the method comprises at least one of the following features:

removing 90% of at least one of the group which consists of chlorine, lead, and cadmium, from the industrial dust;

removing 80% fluorine or potassium from the industrial dust;

removing 45% sodium from the industrial dust.

16. The method according to claim 1, wherein thermally treating the industrial dust by the heating device is performed for 60 minutes or more.

17. A method of providing a metal oxide, comprising:

manufacturing a metal or metal oxide product according to claim 1; and further processing the metal or metal oxide product, to provide a metal oxide or a secondary metal oxide.

18. The method according to claim 17, wherein further processing the metal or metal oxide product is performed in an electrolysis-free manner.

\* \* \* \* \*